Jan. 9, 1968   R. RICHOUX   3,362,249
FLEXIBLE FORCE-TRANSMITTING MECHANISM
Filed May 3, 1965   3 Sheets-Sheet 3
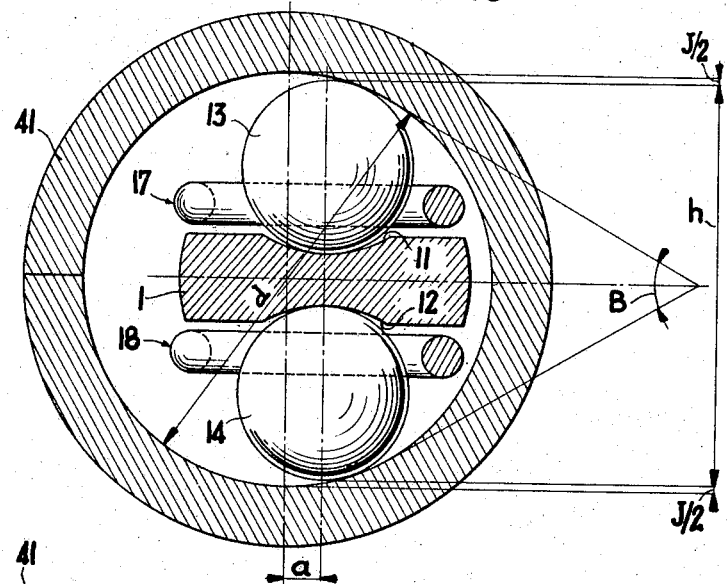
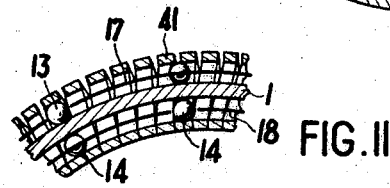
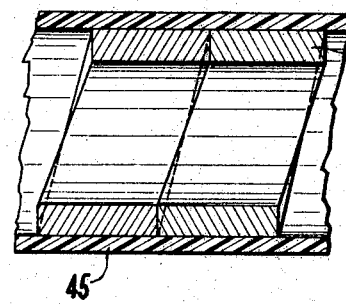
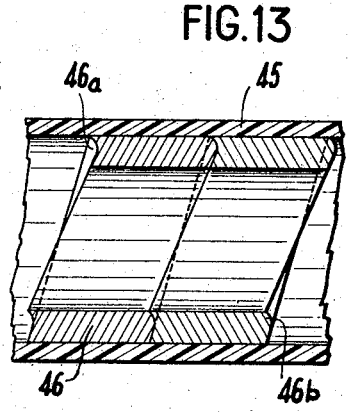
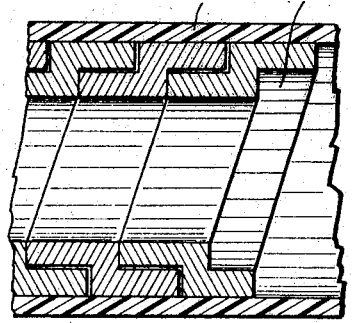

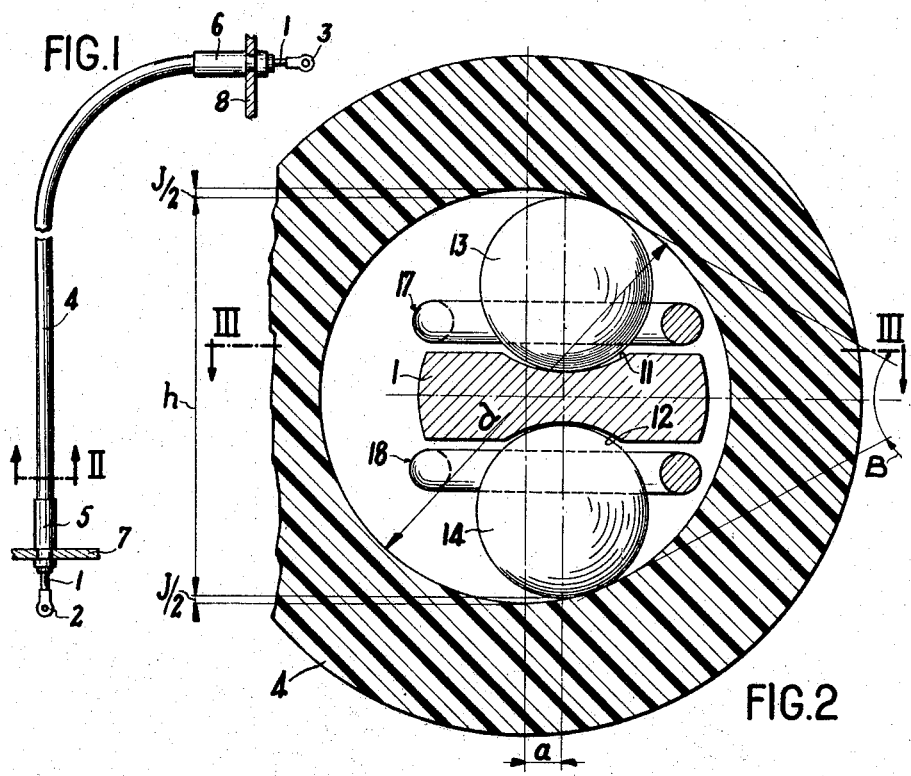
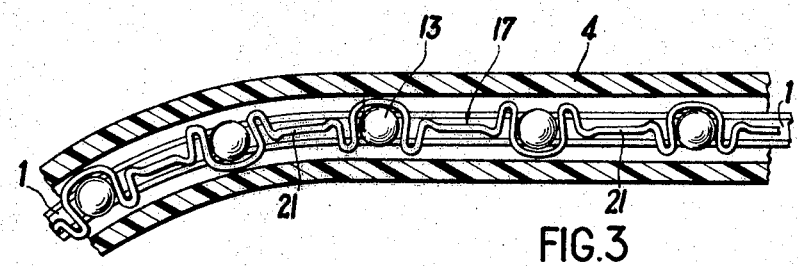
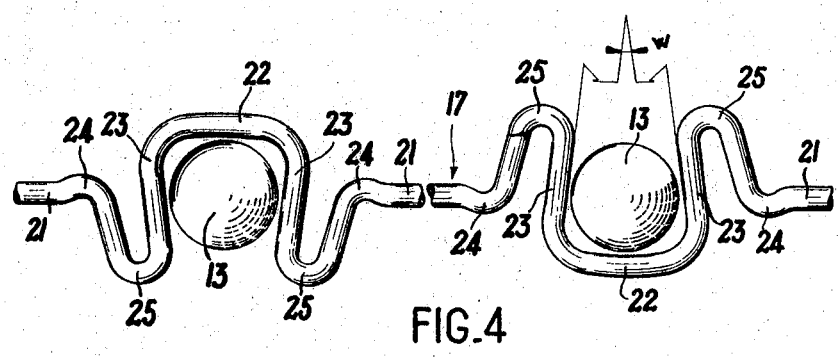

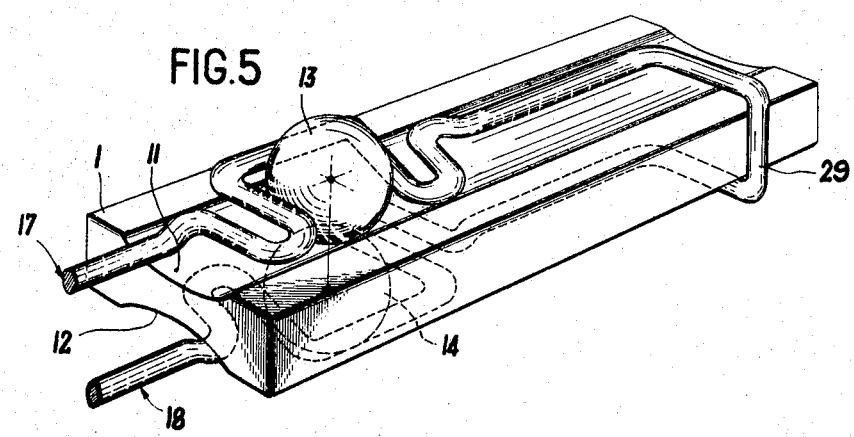
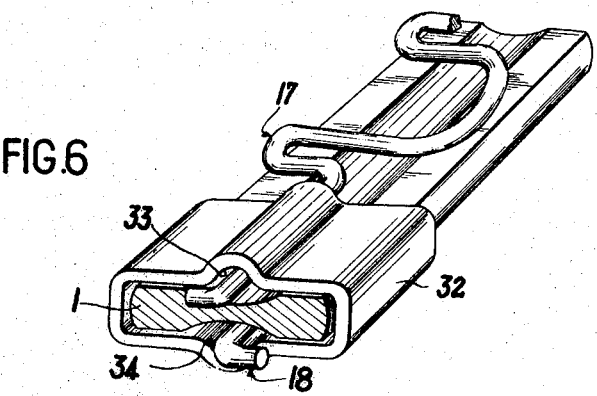
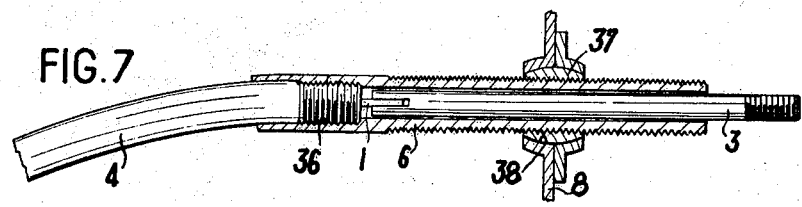
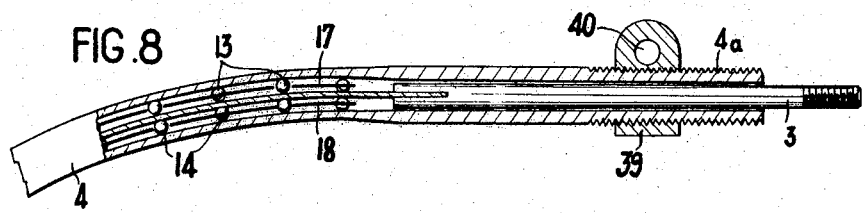
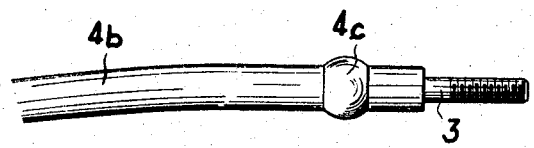

United States Patent Office 3,362,249
Patented Jan. 9, 1968

3,362,249
FLEXIBLE FORCE-TRANSMITTING
MECHANISM
Raymond Richoux, 39 Rue Pierre Demours,
Paris 17eme, France
Filed May 3, 1965, Ser. No. 452,806
Claims priority, application France, May 6, 1964,
973,502; July 27, 1964, 983,103
8 Claims. (Cl. 74—501)

ABSTRACT OF THE DISCLOSURE

A force-transmitting device in which a flexible force-transmitting core member extends through a flexible tubular casing member for limited axial displacement with respect thereto, a plurality of bearing elements being in direct rolling engagement with said core member and with said cylindrical casing member, the bearing element being retained in longitudinal spaced relationship by a retainer cage constituted by a length of wire which has been deformed to provide longitudinally spaced U-shaped loops lying in a common general plane with the open sides of the loops alternately directed in opposite directions.

---

This invention relates to devices serving to transmit tractional and/or compressional forces over arcuate or sinuous paths. Such devices are of the type including a flexible, elongated sheath or tubular casing and a flexible, elongated force-transmitting core member extending through the casing and reciprocable a limited amount longitudinally with respect to it. The core member may be in the form of a wire, a strip, or the like.

The invention relates more especially to devices of this type which are adapted for the transmission of relatively large forces and which, accordingly, include antifriction rolling elements, such as balls, interposed between the core and sheath members for reducing the friction accompanying the relative displacements thereof.

Objects of the invention include the provision of force-transmitting mechanisms of this character which will consist of a smaller number of component parts than conventional mechanisms of comparable type; and will consequently be more economical to make and maintain, and more rugged and less space-consuming for a given load-transmitting capacity.

Usually, devices of the kind specified above have included runways or rail members extending in the tubular sheath or casing along oposite generatrices thereof, and the antifriction bearing elements, such as balls, have been arranged to roll in engagement with the rail members at their outer sides. The provision of such rail members or runways in engagement with the antifriction bearings was considered desirable or indispensable for the proper operation of the device to prevent jamming or binding of the elements. It is a specific object of this invention to eliminate entirely such rail members, and to provide the bearing elements in direct rolling engagement with the cylindrical inner surface of the sheath or casing, while at the same time affording fully reliable, jam-free, operation.

The elimination of the rails, in addition to the advantages listed above as resulting from the reduction in the number of components, brings with it further desirable features. The flexibility of the device, for given size and load-transmitting capacity, is considerably increased. Moreover, the troublesome problem heretofore encountered in connection with the attachment of the ends of the rails in such a way as to allow for differential variations in the effective length of the rails due to the curvature of the device, is entirely eliminated.

In conventional flexible force-transmitting devices of the specified kind, the linear arrays of antifriction bearing elements were held in proper aligned relationship and at uniform longitudinal spacings by means of retainer cages, usually provided in the form of sheet metal strips stamped with longitudinally spaced openings adapted to receive the respective bearing elements therein. A retainer cage of this kind has limited flexibility in a direction normal to the plane of the strip, and practically no flexibility whatever in a direction parallel to that plane. This has seriously limited the flexibility of the force-transmitting device as a whole.

Important objects of the invention are to provide an improved form of retainer cage means for a linear array of antifriction bearing elements for use in flexible force-transmitting devices and similar applications, which will possess numerous advantages over conventional retainer cages, including:

Complete flexibility in all directions transverse to the longitudinal dimension thereof, imparting correspondingly improved flexibility characteristics to the device as a whole;

Appreciable resiliency in the longitudinal direction. This has been found to improve the operation of the force-transmitting device after a large number of operating cycles in that it eliminates a tendency of the core member, the retainer cage means and the arrays of bearing elements to "creep" under the effect of unidirectional forces resulting from the differential friction occurring in high-curvature portions of the device, due to which the bearing elements have tended to remain somewhat displaced from their initial positions after the applied force was removed;

A flat configuration and minimal size in all of its transverse dimensions, whereby the retainer cage will be especially well-suited for use in a force-transmitting device in which the bearing elements ride in direct contact engagement with the cylindrical inner surface of the casing, as described above;

Uniformly high strength throughout the length of the retainer cage, coupled with very low weight and inertia, whereby the response speed of the force-transmitting device is increased;

A configuration such that the retainer cage permits an appreciable degree of lateral motion of the individual bearing elements, as required for proper jam-free operation of a "rail-less" force-transmitting device, while developing resilient centering forces which at all times tend to restore the bearing elements to their properly aligned positions;

Minimal friction against the bearing elements;

Easy inexpensive production at high output rates and in unlimited lengths by simple wire-shaping techniques.

The above objects are achieved by the provision of a linear retainer cage in the form of a length of wire of uniform (round or oblong) cross section shaped to include U-shaped loops spaced along its length said loops all lying in a common general plane and having their open sides alternately directed towards one and the opposite side of the retainer cage, and substantially rectilinear sections intermediate said U-shaped loops, said sections being aligned with one another and with the centers of the bearing elements retained in the U-shaped loops.

Exemplary embodiments of the invention will now be described for purposes of illustration but not of limitation with reference to the accompanying drawings, wherein:

FIG. 1 is a small-scale view of a flexible force-transmitting device according to the invention;

FIG. 2 is a large-scale cross sectional view on the line II—II of FIG. 1;

FIG. 3 is a longitudinal section on line III—III of FIG. 2, on a somewhat smaller scale;

FIG. 4 is a detail fragmentary view illustrating the construction of the wire retainer cage of the invention;

FIG. 5 is a perspective view illustrating one form of interconnection between the ends of the opposed retainer cages;

FIG. 6 shows an alternative form of interconnection;

FIG. 7 is a longitudinal section showing one form of the mounting of an end part of the casing in supporting structure;

FIG. 8 illustrates an alternative form of end mounting means;

FIG. 9 is an elevational view of a modified end mounting;

FIG. 10 is a view similar to FIG. 2 but relating to a different construction of the tubular casing or sheath;

FIG. 11 is a fragmentary, small-scale, longitudinal section of the device of FIG. 10, showing the helically wound casing in the condition assumed in a curved portion of the device; and FIGS. 12, 13 and 14 are fragmentary views in longitudinal section showing three modifications of the tubular sheath or casing constructed from a helically wound strip.

The flexible force-transmitting mechanism generally illustrated in FIG. 1 comprises a flexible, elongated inner core member 1 enclosed in a flexible tubular sheath or casing member 4. The core member 1 has force-input and force-output members 2 and 3 attached to its respective ends and connectible to actuator and actuated parts, not shown. The sheath member 4, which in this embodiment is a length of plastic tubing, is fitted at its ends with tubular sleeves 5 and 6 for rigid attachment to supporting frame members 7 and 8.

The core member 1 may comprise a flexible metallic strip of generally flattened cross section (see FIG. 2) formed in its opposite flat side faces with shallow rounded grooves 11 and 12 adapted to receive in rolling engagement therewith respective linear arrays of ball bearing elements 13 and 14. The ball elements in each array are retained in alignment and in uniformly spaced relation by retainer cage members 17 and 18, later described in detail.

As will be apparent from FIG. 2, the ball bearing elements 13 and 14 at their outer sides are in direct rolling engagement with the cylindrical inner surface of the casing member 4. It has been found in accordance with this invention that contrary to prior belief the conventional longitudinal runways or rails which were heretofore generally interposed between the bearing elements and the inner surface of the tubular casing can be entirely dispensed with while still ensuring smooth reliable operation of the mechanism without jamming or binding, provided certain conditions are satisfied. One of these conditions is that the bearing elements are to have appreciable freedom of displacement in the transverse plane.

Specifically, as shown in FIG. 2, the components are so dimensioned that the total transverse dimension $h$ of the parts including the central core member 1 and the opposed arrays of balls 13 and 14 is appreciably smaller than the inner diameter $d$ of the casing 4. The difference between the dimensions $(d-h)$ provides a clearance J of substantial value such that when both arrays of balls 13 and 14 are riding in engagement with the cylindrical casing surface, the areas of contact of the balls with said surface, rather than lying at the ends of a common diameter of the cylindrical surface, lie instead at the ends of a minor chord thereof, as shown. The tangent planes at said contact areas define a relatively large angle B, instead of being parallel to each other or lying at a small angle as would be the case if no appreciable clearance such as J were present. Provided this angle B is made large enough, the mechanism is able to operate smoothly without danger of jamming.

Another important if somewhat obvious prerequisite for the elimination of the runways is that the cylindrical inner surface of the casing directly engaged by the bearing elements must remain free from surface defects throughout the service life of the mechanism. This requires that the tubular casing 4 be made strong enough to preclude damage to said inner surface due to bending of the casing (and/or external impacts), while remaining sufficiently flexible for the purposes of the device. According to one embodiment of the invention, these conditions are met by making the tubular sheath 4 from a suitable plastic material, such as plasticized vinyl chloride polymer, a superpolyamid such as "Rilsan" preferably containing graphite therein, or the plastic known as "Delrin," or any other suitable plastic composition having an elastic yield limit greater than about 1.5 kilogram per square millimeter (when applied for a period of 3 seconds) and an elasticity modulus higher than about 100 kg./sq. mm.

The retainer cage members 17 and 18 used according to the invention will now be described. The two retainer cages are identical, and each cage, such as 17, is formed from a length of wire of uniform cross section, preferably round or oblong, bent to the configuration shown in FIGS. 3 and 4.

The wire is bent to provide U-shaped loops 22 uniformly spaced along its length and all lying in a common general plane. The open sides of the U-shaped loops are alternately directed to one and the opposite side of the cage. The loops are dimensioned to retain individual bearing elements 13 therein while permitting free rotation of said elements. Between adjacent U-loops 22 the cage includes generally rectilinear wire sections 21, which extend in alignment with the axis of symmetry of the cage and with the centers of rotation of the elements 13 held in the loops, so as to transmit longitudinal forces without deformation. Each straight segment 21 connects at each end with a U-loop by way of a small jutting part 24 projecting towards the same side as the closed end of the adjacent U-loop, followed by a longer segment 25 bent in the opposite direction and forming a hairpin bend with the adjacent end leg 23 of the U-loop.

It will be noted that said legs 23 are angled towards each other towards the open side of the loop, the angle between the legs being indicated as $w$. This relative inclination of the legs has an important function in centering the array of balls with respect to the cage. That is, when a leg 23 bears against a ball 13, the angling of the legs tends to hold the ball in engagement with the crossbar at the closed side of the U-loop, i.e. to retain the ball inside the loop and, owing to the alternating relationship of the open sides of the consecutive U-loops on opposite sides of the structure, this acts to center the entire cage 17 laterally with respect to the array of balls, and to restore the array into alignment along the bottom of the groove 11 in the core member 1, while at the same time permitting the lateral excursions of the balls within the cylindrical inner surface of the casing 4, as explained above, owing to the transverse flexibility of the wire cage.

The cages can conveniently be made from high-tensile wire stock such as piano wire of cold-worked 0.75% carbon steel or stainless steel of 200 kg./sq. mm. (285,000 p.s.i.) tensile strength or higher. The resulting cage will have a mechanical strength very much greater than anything that can be obtained from stamped steel strip or the like. At the same time it can be very economically constructed. Because of its flat shape it can easily be positioned in the restricted space available between the related side of the core member 1 and the cylindrical inner surface of the sheath, and will still permit the lateral displacements of the balls within said surface (as indicated at $a$ in FIG. 2).

Moreover a cage constructed as described will possess substantial elastic elongation in the longitudinal direction, which can easily attain 1 to 3% or more of the effective length of the cage. This capacity for elastic elongation has been found important for the proper functioning of the device. In the arcuate sections of the transmission path, the displacement of the bearing elements tends to be greater in one direction than in the other. Under these conditions, a retainer cage of rigid and non-deformable construction in the longitudinal direction tends to creep systematically in said one direction and after a sufficiently great number of operating cycles the length of stroke available for the system would be appreciably diminished. Due to the longitudinal resiliency of the retainer cage of the invention, the differential action of the bearing elements will simply result in local elastic elongation of the cage without any tendency to bodily displacement of it.

The two retainer cages 17 and 18 are preferably arranged with their U-shaped loops registering as between the two cages. One convenient way of providing the two cages is to form both cages from a single length of wire, as shown in FIG. 5, and bending the common length of wire in its mid-region so as to pass around one side of the core member 1, as indicated at 29, near a related extremity of the device.

In the alternative construction shown in FIG. 6, the two retainer cages 17 and 18 are made from separate lengths of wire and are rigidly interconnected at their adjacent ends by means of a rectangular collar or sleeve 32 of suitable shape which is freely slidable around the core member 1 and is formed with opposed recesses 33, 34 in the inner surfaces of its flat sides, through which straight end segments of the respective wire cages 17 and 18 are passed. The outer ends of the wires are then bent at right angles against one end of the collar 32 while the hairpin bend 25 of the initial U-shaped loop of the cage is positioned adjacent the other end of said collar, to block the assembly in position.

If desired, the retainer cages 17 and 18 may be left entirely free at both ends instead of being fixed as just described.

FIG. 7 illustrates one manner of securing the flexible casing 4 of plastic material to its tubular end fitting such as 6. As shown, an end part of sheath 4 is engaged in a screw threaded inner surface near one end of the tubular fitting 6, which may be metallic. The end fitting 6 has an externally threaded part engaged in the complementarily threaded bore formed in a ball member 37 swivelled in a spherical seating member 38 secured to a frame wall member 8. The drawing also shows a rod 3 slidable in the tubular fitting 6 and constituting the force-input or output element having one end connected to the force-transmitting core member I. Rod 3 in this showing has its outer end screw threaded.

FIG. 8 shows a somewhat simpler embodiment in which a screw thread 4a formed directly on the outer surface of the sheath 4 is engaged in the threaded bore of a member 39 adapted to be pivoted about a pivot pin 40 projecting from a frame wall or the like.

Conveniently, as also shown in FIG. 8, the sheath member 4 has a somewhat greater wall thickness in its end part in which the force-input or -output rod 3 is slidable, than the wall thickness over the remaining length of the sheath. Such local thickening can be readily accomplished by compressing the plastic tube axially while heating said end portion. This measure serves to ensure that the end portion of the sheath will remain substantially rectilinear regardless of the curvature that may be imparted to the remainder of the sheath, and thereby will not interfere with the smooth sliding of the end rod 3.

In the further modification shown in FIG. 9, the end part 4b of the sheath 4, preferably provided with a thickened wall as in FIG. 8, has a part-spherical swivel member 4c directly formed thereon by press-forming the thermoplastic material from which the sheath is formed at suitably elevated temperature. The ball member 4c may be received in a spherical swivel seat similar to the member 38 shown in FIG. 7.

The various constructions just described illustrates the fact that a tubular sheath of a force-transmitting device according to the invention when made of suitable plastic material as here described, will considerably facilitate construction and can in fact make it possible to dispense with any metal parts whatever for attaching the ends of the sheath to supports. The plastic can be conformed to any particular shape that may be best suited for attachment of the ends of the force transfer device, depending on the particular application.

The embodiment of the invention illustrated in FIGS. 10 and 11 is similar to that described with reference to FIGS. 1–4 and similar elements have been designated with similar numerals so that they do not require to be described anew. In this case however the tubular cylindrical sheath or casing, designated 41, is obtained by helically winding a flexible metal strip with closely juxtaposed turns, in a suitable pre-stressed condition, and with the major dimension of the strip cross section extending in the longitudinal direction of the sheath. The pre-stress is applied in a sense to press the turns of the helix forcibly against one another under substantial resilient force. When a helically wound sheath of this character is curved in an arcuate section of the path of the force-transmitting device, as shown in FIG. 11, the turns will tend to separate along the outer or convex side of the arc. However, since in such an arcuate section of the device the ball bearing elements 13 and 14 are subjected to a radial force directed towards the center of curvature of the arc during the transmission of traction forces, the inner balls 14 will engage the tightly-compressed sides of the turns of the helical sheath while the outer balls 13 will engage the core member 1, not the separated parts of the helical sheath, so that correct operation of the device is preserved.

In many instances a helical metallic sheath of the character just described will be quite adequate per se to provide full protection for the device. If desired however, for example in applications where fluid-tightness is desirable, for the device, the helical wire sheath constructed as just described may be provided with an outer cover such as a flexible tube of suitable plastic material 45, as shown in FIG. 12. Since such an outer cover will possess mechanical strength in its own right, the radial dimensioning of the helical wire sheath 41 may, if desired, be reduced.

Advantageously the strip from which a helical sheath of the type described is formed may be so contoured as to provide for the interfitting of adjacent turns of the helix. Thus, in FIG. 13, the strip 46 is shown contoured to a convex shape at one of its end edges as at 46b, and contoured to a complementary concave shape at its opposite end edges at 46a. In the modified form of FIG. 14, the strip is contoured to the shape of an S with rectangular legs, as shown. Preferably the radially inner leg of the S is a little longer than the radially outer leg in order to provide a smooth continuous inner cylindrical surface for rolling engagement with the balls, as shown. The interfitting of the helical turns as in FIGS. 13 and 14 improves the strength of the sheath especially to transverse or shear stresses.

In order that a helically wound sheath of the general type described with reference to FIGS. 10–14 shall possess optical mechanical strength, especially in the smaller-radius arcuate sections of the force-transmitting device, it is preferred that the strip from which the sheath is wound has a generally rectangular cross sectional contour with a substantial length/width ratio, preferably a ratio of about from 3:1 to 5:1.

Force-transfer devices constructed according to the invention are, well-suited for the transmission of both traction and compression forces. When traction forces are transmitted the sheath is stressed in compression, and when compression forces are transmitted the sheath is stressed in tension. With the all-plastic tubular sheaths first described herein, the device will generally be capable of transmitting compresson and traction forces of the same general order of magnitude. The helical strip wound sheaths will transmit higher traction forces but more moderate compression forces.

The devices disclosed herein possess important advantages over conventional force-transfer devices of comparable type. Owing to the omission of the rails or runways heretofore interposed between the ball bearing elements and the inner surfaces of the sheath or casing of the device, the number of component parts is reduced, reducing both the manufacturing costs and the transverse space requirements as well as the weight of the device, while increasing its flexibility. At the same time the operation of the device is extremely reliable, without danger of jamming or binding even in cases where the path of the device is highly curved. These advantages are made possible, inter alia, by the novel form of retainer cage means provided by the invention. That is, the requirement that the balls must directly engage a cylindrical rolling surface (the inner surface of the tubular casing) entails the necessity of providing considerable clearance if jamming is to be averted. This in turn requires the balls to have considerably more freedom of transverse movement within the sheath. The shaped wire retainer cage disclosed makes possible such freedom of transverse displacement of the balls while at the same time developing restoring forces which act at all times to re-center the balls with respect to the center axis of the retainer cage and the axially displaceable core member. Further, the said wire retainer cage is inherently economical of space so that it can be effectively housed within the very limited space available between the balls and the cylindrical surface directly engaged by them. The wire retainer cages of the invention, in addition to their ball-recentering function and their extremely limited space requirements, have the further important advantage of greatly increased flexibility in all lateral directions as well as resiliency in the longitudinal direction. This last feature is of especial importance in assuring proper operation of the device over long periods of time in that it overcomes the tendency of the arrays of balls to "creep" in one direction under the action of differential travels of the balls that tend to take place in curved sections of the device.

The improved retainer cage means of the invention are at the same time very simple and economical to constuct from a continuous length of strong steel wire of uniform cross section, through simple repetitive shaping operations whereby unlimited lengths of retainer cage means can be quickly and cheaply produced. The resulting shaped wire cages are both stronger and lighter in weight than anything that could be obtained using other processes, such as stamping.

The uniform cross section of the wire is positive insurance against the presence of weak points liable to provide points of incipient fracture on prolonged operation. The very long inertia enhances the operating speed of the device, especially in those applications where the device is required to transmit rapid reciprocatory forces.

Owing to the rounded, i.e. circular or possibly oblong, cross section of the wire constituting the cage, friction is reduced to a minimum.

What I claim is:

1. A force-transmitting device comprising;
   a flexible tubular casing member having a substantially smooth cylindrical inner surface;
   a flexible force-transmitting core member extending through the casing member for limited axial displacement with respect thereto and having a generally flat surface;
   an array of bearing elements having areas in direct rolling engagement with said flat surface of said core member and other areas in direct rolling engagement with said cylindrical casing surface;
   said core member and bearing elements being so dimensioned in a transverse direction normal to said flat surface as to have substantial clearance for movement in a transverse plane of said device; and
   retainer cage means extending through said casing member and possessing substantial resiliency in a longitudinal direction as well as flexibility in all directions in said transverse plane, said retainer cage means comprising;
   a length of wire continuously deformed to present longitudinally spaced loops in a common general plane parallel to said flat surface for retention of respective bearing elements in respective ones of said loops, said loops being U-shaped loops with their open sides alternately directed in opposite directions, and including generally rectilinear portions of said wire intermediate said loops, said portions being longitudinally aligned with one another and generally aligned with the centers of rotation of said bearing elements retained in the loops, and hairpin-bent connecting portions interconnecting said rectilinear portions with adjacent legs of said U-shaped loops.

2. A force-transmitting device comprising:
   a flexible tubular casing member having a substantially smooth cylindrical inner surface;
   a flexible force-transmitting core member in the form of a strip extending through the casing member for limited axial displacement with respect thereto;
   said strip having shallow rounded grooves formed in opposite flat side faces longitudinally thereof;
   two arrays of ball bearing elements each having areas in rolling engagement with a groove of said strip and areas in direct rolling engagement with said cylindrical casing surface;
   said core member and bearing elements being so dimensioned in a transverse direction normal to the major cross sectional dimension of said strip as to have substantial freedom of movement in a transverse plane of said device; and
   retainer cage means associated with each array of elements and comprising a length of wire deformed to present longitudinally spaced U-shaped loops lying in a common general plane parallel to said strip with the open sides of said loops alternately directed in opposite directions for retention of respective bearing elements in respective loops, and generally rectilinear portions intermediate said loops longitudinally aligned with one another and with the centers of rotation of said bearing elements.

3. The device defined in claim 2, wherein said tubular casing member comprises tubing of a plastic composition having an elastic yield point not less than about 1.5 kg. per sq. millimeter and an elasticity modulus not less than about 100 kg. per sq. mm.

4. The device defined in claim 2, wherein said tubular casing member comprises a helically wound metallic strip with closely adjacent turns, the major cross sectional dimension of said strip extending parallel to the longitudinal axis of the helical winding.

5. The device defined in claim 4, wherein said strip has mutually interengageable, complementarily shaped portions formed in the opposite surfaces thereof at the ends of its major cross-sectional dimension, for mutual interfitting of the adjacent helical turns thereof.

6. The device defined in claim 3, wherein said plastic tubular casing includes an end section of substantial length provided with an increased wall thickness for increasing the flexional rigidity thereof, and said core member has a cylindrical end part attached to a corresponding end thereof and slidable in said casing end section.

7. The device defined in claim 6, wherein said casing end section is externally shaped for engagement with a support.

8. A mechanism comprising a pair of flexible, elongated members assembled for limited longitudinal reciprocation with respect to each other, an array of bearing elements interposed between cooperating surfaces of said members, and a retainer cage for said elements comprising a length of wire deformed to provide longitudinally spaced U-shaped loops lying in a common general plane with the open sides of said loops alternately directed in opposite directions for retention of respective elements in respective loops, and generally rectilinear portions intermediate said loops longitudinally aligned with one another and with the centers of rotation of said bearing elements, said retainer cage including substantially rectilinear sections intermediate said loops longitudinally aligned with one another and with the centers of said elements, and hairpin-bent portions interconnecting said rectilinear sections with said legs of the loops.

References Cited

UNITED STATES PATENTS

| 787,904 | 4/1905 | Dring | 74—501 |
|---|---|---|---|
| 1,743,506 | 1/1930 | Watson | 74—501 |
| 1,900,512 | 3/1933 | Madden | 74—501 |
| 2,442,360 | 6/1948 | Herkert | 74—501 |
| 2,457,910 | 1/1949 | McLaren et al. | 74—501 |
| 3,217,557 | 11/1965 | Martinot | 74—501 |

FOREIGN PATENTS

| 493,880 | 5/1919 | France. |
|---|---|---|
| 120,380 | 1/1919 | Great Britain. |
| 978,314 | 12/1964 | Great Britain. |
| 264,397 | 1/1950 | Switzerland. |

FRED C. MATTERN, JR., *Primary Examiner.*

C. F. GREEN, *Assistant Examiner.*